United States Patent [19]
Crawford

[11] Patent Number: 5,791,693
[45] Date of Patent: Aug. 11, 1998

[54] PUP JOINT WITH INTEGRAL WING NUT RETENTION SHOULDER

[75] Inventor: Paul A. Crawford, Stephenville, Tex.

[73] Assignee: FMC Corporation, Chicago, Ill.

[21] Appl. No.: 962,182

[22] Filed: Oct. 31, 1997

Related U.S. Application Data

[63] Continuation of Ser. No. 651,646, May 22, 1996, abandoned.

[51] Int. Cl.⁶ ............................................. F16L 19/025
[52] U.S. Cl. ...................... 285/23; 285/354; 285/387; 285/388
[58] Field of Search ..................... 285/23, 354, 386, 285/387, 388, 321

[56] References Cited

U.S. PATENT DOCUMENTS

| 1,186,021 | 6/1916 | Mezfger | 285/388 |
|---|---|---|---|
| 2,298,109 | 10/1942 | Frank | 285/388 |
| 3,751,077 | 8/1973 | Hiszpanski | 285/386 |
| 4,116,477 | 9/1978 | Wahoski | 285/386 |
| 4,124,234 | 11/1978 | Clark | 285/388 |
| 4,575,044 | 3/1986 | Gentry | 285/388 |
| 4,648,634 | 3/1987 | Kelch | 285/387 |
| 4,877,270 | 10/1989 | Phillips | 285/387 |
| 5,160,174 | 11/1992 | Thompson | 285/387 |
| 5,362,109 | 11/1994 | Pacnt | 285/388 |

FOREIGN PATENT DOCUMENTS

| 723284 | 3/1980 | U.S.S.R. | 285/387 |
|---|---|---|---|
| 17810 | 1/1914 | United Kingdom | 285/387 |

*Primary Examiner*—Eric K. Nicholson
*Attorney, Agent, or Firm*—Henry C. Query, Jr.

[57] ABSTRACT

A pup joint is provided which comprises a length of pipe, a female sub integral with one end of the pipe and having external threads formed thereon, a male sub integral with the other end of the pipe, a wing nut for threadedly connecting the male sub to the female sub, a set of retainer segments for retaining the wing nut on the pup joint, and a retention shoulder formed on the male sub to maintain the wing nut and retainer segments on the male sub. In a preferred embodiment of the invention, the pipe and the male and female subs are comprised of a single forging, and the retention shoulder is formed by machining the male sub.

3 Claims, 2 Drawing Sheets

U.S. Patent     Aug. 11, 1998     Sheet 1 of 2     5,791,693
FIG_1
(PRIOR ART)
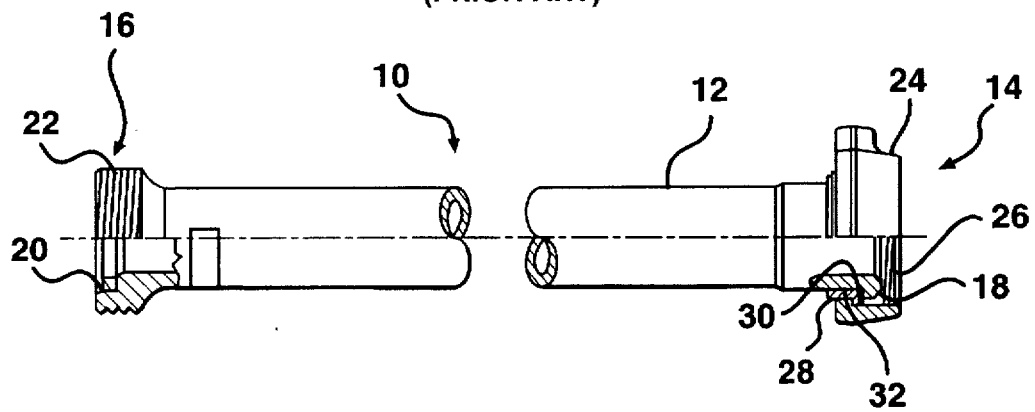
FIG_2
(PRIOR ART)
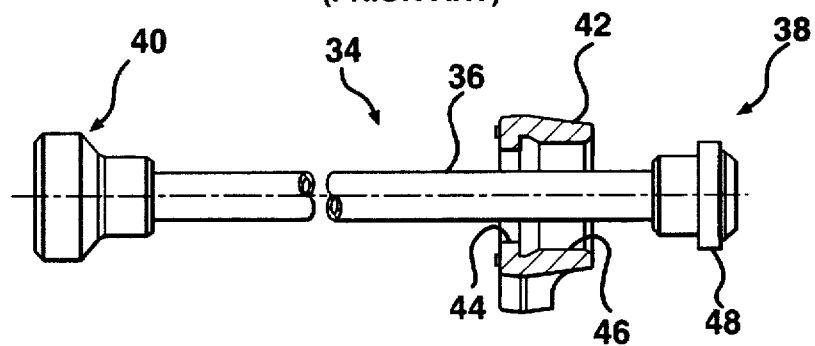
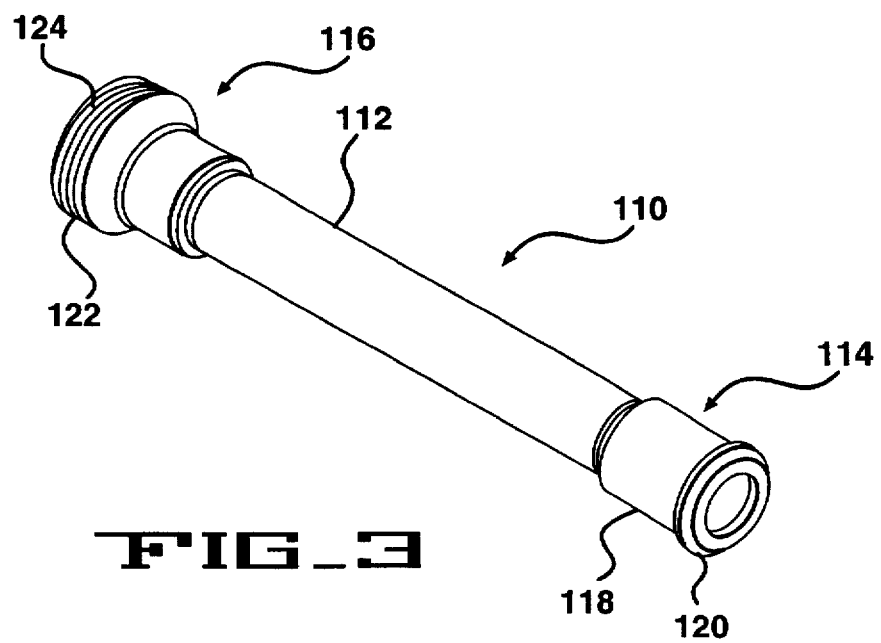
FIG_3

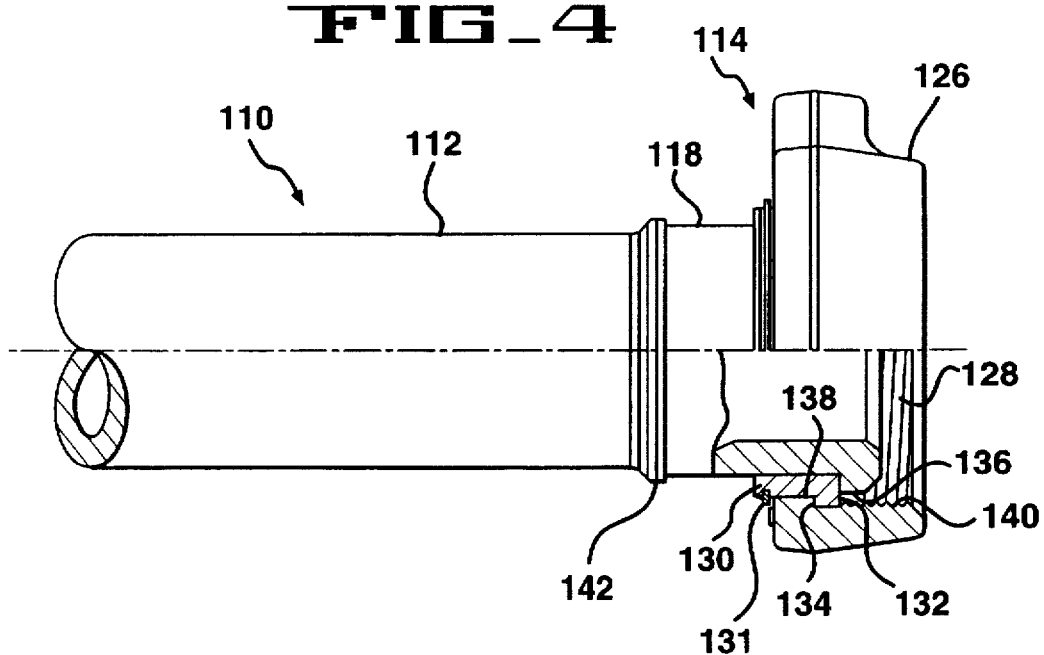
FIG_4
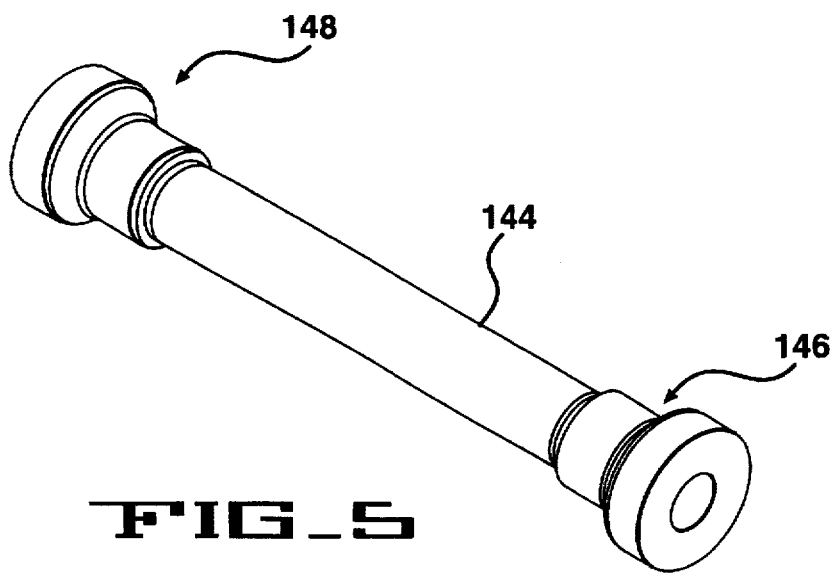
FIG_5

PUP JOINT WITH INTEGRAL WING NUT RETENTION SHOULDER

This application is a continuation, of application Ser. No. 651,646, filed May 22, 1996 now abandoned.

BACKGROUND OF THE INVENTION

1. Field of the Invention

The present invention relates to a pup joint and, more particularly, to a pup joint which includes means for maintaining the wing nut and retainer segments in a position adjacent the male sub at all times.

2. Description of Related Art

Pup joints are relatively small lengths of pipe used in the oilfield industry to conduct fluids from one piece of equipment to another. Typical pup joints comprise a length of pipe having a male sub located at one end, a female sub located at the other end and a wing nut for connecting the male end of one pup joint to the female end of another pup joint. The male sub includes a spherical sealing surface, and the female sub includes a mating conical sealing surface and a set of external threads. The wing nut is retained on the pup joint by means of a shoulder or a set of retainer segments and engages the threads of the female sub to secure two pup joins together.

Maintaining the wing nut and retainer segments adjacent the male sub end has been somewhat of a challenge in prior art pup joints. In certain prior art pup joints constructed of heavy-wall tubing, the wing nut and retainer segments are held in place by means of an interference fit with the male sub tubing. In lighter weight pup joints, however, this interference fit does not exist. Therefore, when a pup joint is held in a non-horizontal position, the wing nut is permitted to slide down the pup joint, thus creating difficulties during installation.

SUMMARY OF THE INVENTION

Therefore, it is an object of the present invention to provide a pup joint which includes means for maintaining the wing nut and retainer segments adjacent the male sub.

According to the present invention, this and other objects and advantages are achieved by providing a pup joint comprising a length of pipe, a female sub integral with one end of the pipe and having external threads formed thereon, a male sub integral with the other end of the pipe, a wing nut for threadedly connecting the male sub to the female sub, a set of retainer segments for retaining the wing nut on the pup joint, and a retention shoulder extending radially outwardly from the male sub to maintain the wing nut and retainer segments on the male sub. In a preferred embodiment of the invention, the pipe and the male and female subs are comprised of a single forging, and the retention shoulder is formed by machining the male sub. The retention shoulder therefore provides a means for preventing the wing nut and retainer segments from sliding down the pup joint.

These and other objects and advantages of the present invention will be made apparent from the following detailed description, with reference to the accompanying drawings.

BRIEF DESCRIPTION OF THE DRAWINGS

FIG. 1 is a front elevation of one embodiment of a prior art pup joint;

FIG. 2 is a front elevation of another embodiment of a prior art pup joint;

FIG. 3 is a perspective view of a portion of the pup joint of the present invention FIG. 4 is a partial front elevation of the pup joint of the present invention; and FIG. 5 is a perspective view of a forging used to construct a pup joint according to one embodiment of the present invention.

DETAILED DESCRIPTION OF THE PREFERRED EMBODIMENTS

Referring to FIG. 1, a prior art pup joint 10 is shown which comprises a length of pipe 12, an integrally formed male sub 14 at one end of pipe 12 and an integrally formed female sub 16 at the other end of pipe 12. Male sub 14 includes a spherical sealing surface 18, while female sub 16 includes a mating is conical sealing surface 20. Female sub 16 also includes a set of threads 22 formed on an exterior surface thereof, and pup joint 10 further comprises a wing nut 24 having a set of internal threads 26 formed therein for engaging the threads 22 of a female sub 16 of another pup joint 10. Nut 24 is retained on pup joint 10 by means of retainer segments 28, which simultaneously engage a rearward shoulder 30 extending radially inwardly from the interior surface of nut 24 and a forward shoulder 32 extending radially outwardly from the exterior surface of male sub 14 to thereby prevent nut 24 from pulling off of pup joint 10 (to the right in FIG. 1) when nut 24 is threaded onto the female sub of another pup joint. In each of the embodiments described herein, it should be recognized that the pup joint, including the length of pipe and the male and female subs, includes a fluid flow passage extending completely longitudinally therethrough.

Referring to FIG. 2, another prior art pup joint, indicated generally at 34, is shown which comprises a length of pipe 36, a male sub 38 and a female sub 40. In this pup joint, male sub 38 and female sub 40 are threaded onto corresponding ends of pipe 36. Prior to threading male sub 38 onto pipe 36, a wing nut 42 is assembled over pipe 36. Wing nut 42 comprises a rearward shoulder 44 extending radially inwardly from an interior surface 46 thereof, and wing nut 42 is retained on pup joint 34 by means of the engagement of rearward shoulder 44 with a forward shoulder 48 of greater diameter than rearward shoulder 44 extending radially outwardly from male sub 38.

Referring to FIG. 3, the pup joint of the present invention, indicated generally at 110, is shown to comprise a length of pipe 112, a male sub 114 located at one end of pipe 112 and a female sub 116 located at the other end of pipe 112. Male sub 114 and female sub 116 may either be formed integral with pipe 112 as a single forging or manufactured individually and then threaded onto the ends of pipe 112. Male sub 114 comprises an enlarged diameter section 118 and a spherical sealing surface 120. Female sub 116 comprises an enlarged diameter section 122 having external threads 124 formed thereon and a conical sealing surface (not shown) adapted to mate with spherical sealing surface 120 of another pup joint 110.

Referring to FIG. 4, pup joint 110 also comprises a wing nut 126 having internal threads 128 designed to engage the threads 124 of another pup joint 110 to thereby secure two pup joints 110 together. Nut 126 is retained on pup joint 110 by means of one or more retainer segments 130. Retainer segments 130 comprise an inner diameter corresponding generally to the outer diameter of enlarged diameter section 118, a front face 132 and a rear face 134. When nut 126 and retainer segments 130 are assembled on male sub 114, front face 132 engages an annular forward shoulder 136 extending radially outwardly from enlarged diameter section 118 of male sub 114 and rear face 134 engages a rearward shoulder 138 extending radially inwardly from an inner surface 140 of nut 126 to thereby prevent nut 126 from pulling off of pup joint 110 (to the right in FIG. 4) when nut 126 is threaded onto the female sub of another pup joint.

According to the present invention, pup joint 110 is also provided with a retention shoulder 142 extending radially outwardly from enlarged diameter section 118 of male sub 114. Retention shoulder 142 comprises an outside diameter which is greater than the inside diameter of retainer segments 130. Rearward shoulder 138 of nut 126 is restricted from movement relative to retainer segments 130 by a retainer ring 131 located in a corresponding groove in retainer segments 130. In an embodiment of the invention wherein retention segments 130 are not employed, such as in conjunction with the pup joint 34 described in reference to FIG. 2, retention shoulder 142 comprises an outside diameter which is greater than the diameter of rearward shoulder 138 of nut 126. Therefore, nut 126 and retainer segments 130 (or nut 126 alone) are preventing from sliding off of male sub 114 and down pipe 112 (to the left in FIG. 4) when pup joint 110 is oriented in a non-horizontal position.

Referring to FIG. 5, pup joint 110 is preferably constructed of a single forging 144 comprising identical upset ends 146,148. Upset end 146 is machined into male sub 114, and retention shoulder 142 is formed by turning down large diameter section 118. Upset end 148 is likewise machined into female sub 116. This method of manufacture simplifies the forging process. In addition, this method of manufacture results in a retention shoulder which cannot be removed or otherwise defeated in the field.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A pup joint comprising:

length of pipe;

a female sub connected to a first end of the pipe, the female sub including a conical sealing surface, an outer surface formed adjacent the conical sealing surface and external threads formed on the outer surface;

a male sub connected to the distal end of the pipe, the male sub including a forward shoulder extending radially outwardly therefrom and a spherical sealing surface adjacent the forward shoulder which is adapted to mate with and seal against the conical sealing surface of another such pup joint;

a nut having an internal surface, internal threads formed on the internal surface and a rearward shoulder extending radially inwardly from the internal surface;

one or more retainer segments positioned between the rearward shoulder of the nut and the forward shoulder of the male sub for restricting axial movement of the nut relative to the male sub in a first direction;

a retainer ring positioned in a corresponding groove formed in the retainer segments and having an outer diameter which is greater than the diameter of the rearward shoulder to thereby maintain the nut positioned around the retainer segments; and a retention shoulder extending radially outwardly from the male sub rearwardly of the forward shoulder, the retention shoulder comprising an outside diameter greater than the inside diameter of the retainer segments;

whereby the retention shoulder restricts axial movement of the nut and the retainer segments relative to the male sub in a direction opposite the first direction.

2. The pup joint of claim 1, wherein the male sub and the female sub are formed integral with the pipe.

3. The pup joint of claim 2, wherein the pipe, the male sub and the female sub are constructed of a single forging and the retention shoulder is machined into the male sub.

* * * * *